(12) United States Patent
Staudenmaier et al.

(10) Patent No.: US 9,900,548 B2
(45) Date of Patent: Feb. 20, 2018

(54) DISPLAY CONTROL UNIT AND METHOD FOR GENERATING A VIDEO SIGNAL

(75) Inventors: Michael Staudenmaier, Munich (DE); Kshitij Bajaj, Sirsa (IN); Mehul Kumar, Meerut (IN); Sarthak Mittal, Dehli (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/421,894

(22) PCT Filed: Aug. 24, 2012

(86) PCT No.: PCT/IB2012/054299
§ 371 (c)(1),
(2), (4) Date: Feb. 16, 2015

(87) PCT Pub. No.: WO2014/030037
PCT Pub. Date: Feb. 27, 2014

(65) Prior Publication Data
US 2015/0208022 A1      Jul. 23, 2015

(51) Int. Cl.
*G06F 13/00* (2006.01)
*H04N 5/91* (2006.01)
(Continued)

(52) U.S. Cl.
CPC ............... *H04N 5/91* (2013.01); *G06T 1/60* (2013.01); *G09G 5/393* (2013.01); *H04N 5/04* (2013.01);
(Continued)

(58) Field of Classification Search
CPC ............... G09G 5/399; G09G 2310/04; G09G 2320/103; G09G 5/393; G06T 1/60
See application file for complete search history.

(56) References Cited

U.S. PATENT DOCUMENTS 5,617,529 A    4/1997   Dao
7,038,689 B2   5/2006   Willis
(Continued)

FOREIGN PATENT DOCUMENTS

JP    06-175632 A    6/1994
JP    2012-048034 A  3/2012

OTHER PUBLICATIONS

International Search Report and Written Opinion correlating to PCT/IB2012/054299 dated Mar. 27, 2013.
(Continued)

*Primary Examiner* — Hau Nguyen (57) ABSTRACT

A display control unit is connected to a display and arranged to generate a video signal representing a sequence of video frames to be displayed consecutively on said display. The display control unit may include a first memory unit arranged to buffer a set of image descriptors; a second memory unit connected between said first memory unit and said display; an update unit connected to said first memory unit and arranged to update said image descriptors in said first memory unit and to generate a proceed signal only when said set of image descriptors in said first memory unit is up to date; a copy unit arranged to copy said image descriptors from said first memory unit to said second memory unit in response to said proceed signal; and a video unit arranged to generate said video signal on the basis of said image descriptors in said second memory unit.

20 Claims, 4 Drawing Sheets

(51) Int. Cl.
*G09G 5/393* (2006.01)
*G06T 1/60* (2006.01)
*H04N 5/04* (2006.01)
*H04N 5/265* (2006.01)
*G09G 5/00* (2006.01)

(52) U.S. Cl.
CPC ............ *H04N 5/265* (2013.01); *G09G 5/001* (2013.01); *G09G 2320/103* (2013.01); *G09G 2360/10* (2013.01); *G09G 2380/10* (2013.01)

(56) References Cited

U.S. PATENT DOCUMENTS

| | | |
|---|---|---|
| 7,667,708 B2 | 2/2010 | Kamijo et al. |
| 2002/0039099 A1 | 4/2002 | Harper |
| 2004/0130634 A1* | 7/2004 | Delaney ............. H04N 1/00127 348/231.99 |
| 2006/0082580 A1 | 4/2006 | Chow et al. |
| 2006/0121936 A1 | 4/2006 | Paver et al. |
| 2009/0180005 A1* | 7/2009 | Takahashi .......... H04N 1/32101 348/231.2 |
| 2010/0026693 A1* | 2/2010 | Kim ........................ H04N 5/76 345/531 |
| 2011/0279464 A1 | 11/2011 | Klask et al. |

OTHER PUBLICATIONS

Renesas: "SH7764 Group Video Display Controller TFT-LCD Interfacing Example 1", Sep. 2009, REJ06B0920-0100/REV.1 .00, pp. 3-25.

Fujitsu: "MB88F332 Indigo", Jun. 2, 2012; downloaded from <<http://us.fujitsu.com/micro>>, pp. 1-6.

Fujitsu: "Display Controller Block in Fujitsu's GDCs: Salient Features", Mar. 13, 2006, XP002455386; downloaded from <<http://www.fujitsu.com/downloads/MICRO/fma/pdf/FujitsuGDCs.pdf>>, pp. 1-17.

Atmel: "AVR32114: Using the AVR32 LCD Controller", Jul. 2008; downloaded from <<http://www.atmel.com/Images/doc32063.pdf>>, pp. 1-18.

\* cited by examiner

DISPLAY CONTROL UNIT AND METHOD FOR GENERATING A VIDEO SIGNAL

FIELD OF THE INVENTION

This invention relates to a display control unit and method for generating a video signal.

BACKGROUND OF THE INVENTION

A display unit is an electronic device for displaying video on, e.g., a screen to a user. Video may comprise either still or moving images or a combination of both. The display unit may be arranged to receive a video signal representing a sequence of video frames and to display the frames of the sequence consecutively. A video frame may be defined as a still (unanimated or immobile) image to be displayed for a limited amount of time. The inverse of the duration of a frame is known as the frame rate. The frame rate may be measured in frames per second (fps). By choosing a sufficiently high frame rate, for instance, more than 20 fps, an impression of motion may be achieved.

The video signal representing the sequence of video frames may be generated by a display control unit. The display control unit may, for instance, be arranged to generate the video signal on the basis of image data in conjunction with image descriptors. For example, each frame may have associated with it a set of one or more images to be displayed simultaneously by the display unit and a set of image descriptors describing, e.g., a geometrical arrangement of the individual images on a screen or an overlay or superposition of the images on the screen, or both.

SUMMARY OF THE INVENTION

The present invention provides a display control unit and method for generating a video signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
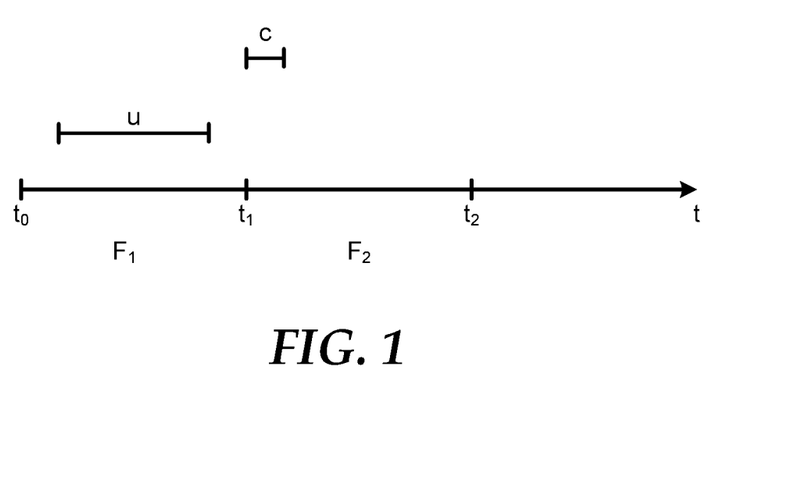
FIGS. 1-4 show timing diagrams illustrating examples of methods for generating a video signal.

FIG. 1 schematically illustrates a method for generating a video signal. The video signal may, for instance, be similar to the video signal 30 described further below in reference to FIG. 5. More specifically, FIG. 1 illustrates an example of a method of updating image descriptors used in generating the video signal. In the figure, a flow of time t is represented by the arrow. A time interval of, e.g., t0 to t1 and, e.g., t1 to t2 may be associated with a first frame and a subsequent next frame of a video stream. For example, the first frame may be generated on, e.g., a screen of a display unit during the first period t0 to t1, and the next frame may be generated during the period t1 to t2. Each frame may, for instance, be generated on the basis of both image data and image descriptors. The image data may, for instance, comprise one or more digital images in a suitable format (e.g., bitmap or jpeg) and a set of image descriptors. The image descriptors may specify details of the graphical representation of the images by the display unit. The image descriptors may, for instance, specify details such as color, brightness, contrast, size, position, rotation, saturation, transparency, or white balance of each or at least one or more of the images used to construct the frame. The image descriptors may further specify, for example, an ordering of the images, e.g., top to bottom level, for displaying the images in an overlaid manner. A frame may be constructed using only one image or more than one image. The image descriptors may also comprise one or more memory addresses for specifying one or more memory locations from which the one or more images may be retrieved.

The image descriptors may be updated while the video is running. Such an update may be triggered, for instance, by a user input or by an automatic update request. For instance, the display unit and the display control unit may be part of a navigation system in a motor vehicle. In this case, the image descriptors may, for instance, be updated automatically in response to detecting that the vehicle, e.g., a motor car, has left a secondary road and has entered a highway. In another example, the image descriptors may be adapted in dependence on a measured speed of the vehicle. Still referring to FIG. 1, the image parameters may, for instance, be updated during a period u in the interval t0 to t1 of the first frame F1. It is noted that updating the image parameters may take a certain amount of time, which may be non-negligible compared to, e.g., the duration of a single frame. For instance, new values of the image parameters may be written to a first memory unit, e.g., a register (shadow register), during the period u. They may notably be written sequentially, e.g. in the same order in which they are computed. When the next frame F2 is initiated, e.g., in response to a vertical synchronization of a screen (vsync) the content of the first memory unit, e.g., the shadow register, may be copied to a second memory unit, e.g., a second register (active register). An example of the period in which the updated image descriptors may thus be copied from the first memory unit to the second memory unit is shown as c in the plot. The display control unit may notably be designed to copy the content of the first memory unit to the second memory unit with of the start of each new frame, e.g., with each refresh. The image descriptors updated in one frame, e.g., F1, may thus become effective for the next frame, e.g., F2.

Figure 2:
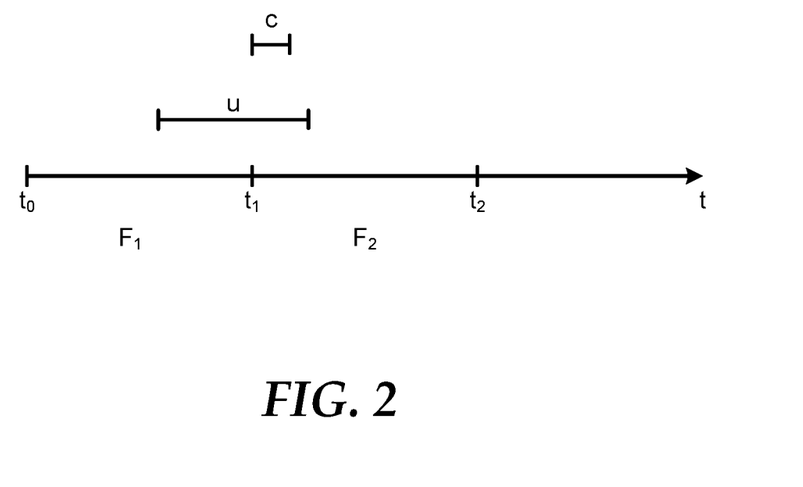

Referring now to FIG. 2, a problem may arise when the updating the content of the first memory unit, e.g., the shadow register, is not completed before the beginning of the next frame, e.g., F2. The beginning of the next frame may coincide with a refresh, e.g. a vertical synchronization (vsync), of the display unit. In the example of FIG. 2, the image descriptors in the first memory unit, e.g., the shadow register, are updated during a period u extending from the period t0 to t1 of the first frame F1 into the period t1 to t2 of the next frame F2. As a consequence, the values of the image descriptors at, e.g., time t1 (that may be the beginning of the next frame F2) may be inconsistent as some of the image descriptors may have been updated while others have not. In other words, the image descriptors in the first memory unit may be only partly up to date.

However, considering an implementation as described in reference to FIG. 1 in which the content of the first memory unit is copied to the second memory unit at the beginning of the next frame (e.g., starting with time t1), a set of image descriptors that is only partly up-to-date and thus may be inconsistent may be copied to, e.g., the second memory unit (e.g., the active register). The next frame, e.g., F2, may thus be generated on the basis of an inconsistent set of image descriptors. This may result in a faulty graphical representation of the next frame (frame F2 in this example). For instance, considering a case in which the frame is constructed using two images, a screen position of the first image may have been updated while a screen position of the second image may not have been updated. This may result in a wrong relative position of the two images on the screen. For instance, the second image may overlay the first image although this may not have been intended. Other odd effects related to such parameters as brightness, color, or contrast, for example, may also occur.

Figure 3:
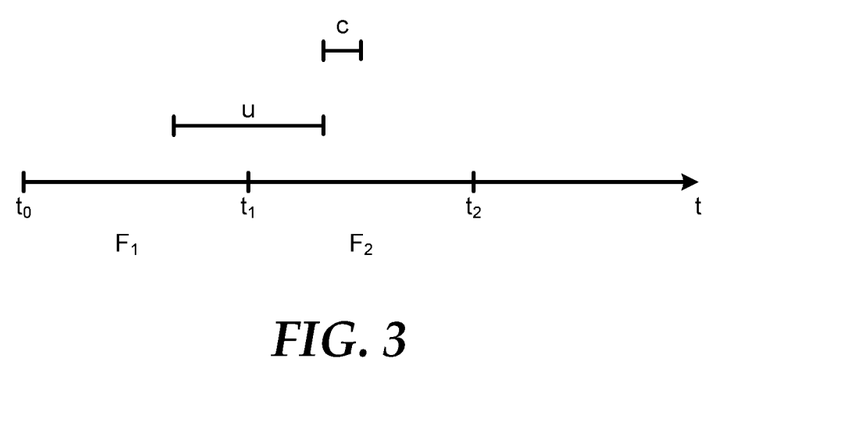

Another example of a method of generating a video signal representing a sequence of video frames is described in reference to FIG. 3. The video signal may, for instance, be the video signal 30 shown in FIG. 5. The example of FIG. 3 may be similar to the one of FIG. 2 in that updating the image descriptors in the first memory unit may not have been completed at the beginning of the next frame, e.g., F2. In the example shown, the set of image descriptors may have been updated completely at a time between, e.g., t1 and t2, that is within the period of the second frame F2. However, in contrast to the example of FIG. 2, the copying the content of the first memory unit to the second memory unit, e.g., from the shadow register to the active register, may be performed in response to an indication that the complete set of image descriptors in the first memory unit is up-to-date. For instance, an application running on, e.g., a processor, may be arranged to determine, e.g., calculate, new values of the image descriptors and to write them, e.g., successively to the first memory unit. The application may further be arranged to generate a proceed signal only when the set of image descriptors in the first memory unit is up-to-date, for instance, in response to determining that every new image descriptor value has been written to the first memory unit. A copy unit, e.g., copy unit 24 of FIG. 5, may further be arranged to copy the set of image descriptors from the first memory unit to the second memory unit in response to the proceed signal. It may thus be ensured that the image descriptors in the second memory unit are consistent when they may be evaluated to generate the video signal.

Figure 4:
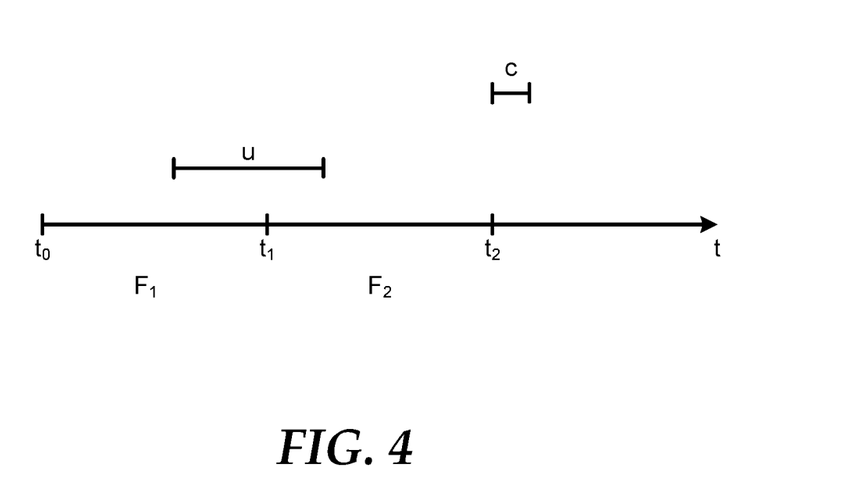

In the shown example (still referring to FIG. 3), the image descriptors may be copied from the first memory unit to the second memory unit in immediate response to said indication that the complete set of image descriptors in the first memory unit is up-to-date. Alternatively, the image descriptors may be copied, for example, at the next refresh, e.g. with the next vertical synchronization (see FIG. 4). The copy unit 24 may, for instance, be arranged to copy the image descriptors from the first memory unit to the second memory unit in response to the beginning of a new frame, e.g., in response to a vsync, only when it has also received the proceed signal from the application. In other words, copying the image descriptors from the first to the second memory unit may be synchronized with respect to refreshing the display. This may facilitate implementing the scheme in a synchronous device or synchronous system.

Figure 5:
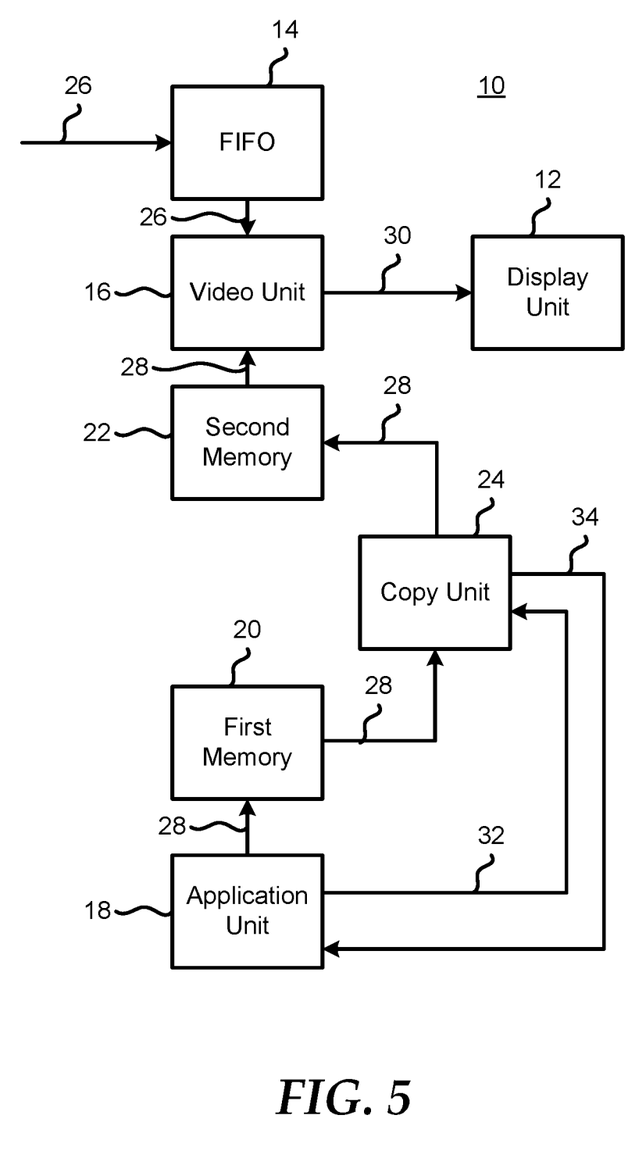
FIG. 5 schematically shows a block diagram an example of an embodiment of a display control unit.

An example of the method described above in reference to FIGS. 3 and 4 is further described in reference to FIG. 5. FIG. 5 illustrates an example of a display control unit 10. The display control unit 10 may be connected or connectable to a display unit 12. In the shown example, the display control unit 10 may comprise, e.g., a buffer 14, a video unit 16, a first memory unit 20, a second memory unit 22, and a copy unit 23. The buffer 14 may, for instance, be a first-in, first-out (FIFO) buffer. The first memory unit 20 may be a register (shadow register), for example. The second memory unit 22 may, for example, also be a register (active register). The application unit 18 may also be referred to as the update unit 18 as it may be arranged to update a set of image descriptors in the first memory unit 20.

The display control unit 10, the display unit 12, and the update unit 18 may be arranged to operate as follows, for example. The buffer 14 may buffer consecutive segments of an incoming data stream 26, e.g. an image stream, and transfer them to the video unit 16. The buffer 14 may thus be beneficial for relaxing latency requirements on the incoming image stream 26. The buffer 14 may notably be a first-in first-out (FIFO buffer). The image stream 26 may for instance comprise digital images to be displayed by the display unit 12 on, e.g., a screen or monitor. The image stream 26 may, for instance, provide a set of digital images for each new frame. Alternatively, the image stream 26 may provide a set of new digital images only when these images differ from the images associated with the preceding frame. The update unit 18 may be arranged to write the values of the image descriptors 28 to the first memory unit 20. The update unit 18 may notably be arranged to update the image descriptors in the first memory unit 20 individually, e.g. sequentially, rather than collectively. For instance, the update unit 28 may update some of the image descriptors in the first memory unit 20 and leave the remaining image descriptors in the set of image descriptors unchanged. The first memory unit 20 may be connected to the second memory unit 22 via the copy unit 24. In other words, the copy unit 24 may be connected between the first memory unit 20 and the second memory 22.

The image stream 26 may, for example, be retrieved from a memory unit (image data unit), e.g. from a main memory unit (not shown). The image descriptors may notably comprise memory addresses for specifying data locations in the image data unit from where the image stream 26 may be retrieved. The image stream 26 may thus be generated in dependence on the image descriptors in, e.g., the second memory unit 22.

Referring back to FIGS. 1 and 2, the copy unit 24 may be arranged to copy the content of the first memory unit 20 to the second memory unit 22 in response to the start of a new frame, for instance, in response to a vertical synchronization of the display unit 12. However, in the present example, the copy unit 24 may be arranged to copy the content of the first memory unit 20 to the second memory unit 22 only in response to a proceed signal 32 generated by the update unit 18. The update unit 18 may be arranged to generate the proceed signal 32 when it has completed updating the set of image descriptors in the first memory unit 20. The proceed signal 32 may thus indicate that the set of image descriptors in the first memory unit 20 is consistent. It may thus be ensured that only consistent sets of image descriptors may be copied from the first memory unit 20, e.g., the shadow register, to the second memory unit 22, e.g., the active register. A risk of image artifacts in the video displayed by the display unit 12 may thus be reduced or eliminated altogether.

The video unit 16 may be arranged to generate the video signal 30 on the basis of both the image data 26 received from, e.g., the buffer 14 and the image descriptors 28 received from, e.g., the second memory unit 22. The video unit 16 may, for instance, be or comprise a digital signal processor (DSP). In another example, the video unit 16 and the update unit 18 may share one processor. In other words, a single processor or, e.g., a multicore processor may provide the video unit 16 and the update unit 18. The video unit 16 may for instance be a dedicated hardware for generating a frame, i.e. an output picture, e.g. an assembled picture, from elements described by the descriptors. An implementation of the video unit 16 as dedicated hardware may be particularly convenient because its function may be realtime, fixed, and computationally intensive. The application unit 18 may also be arranged to generate the image data 26 or to retrieve it from a data storage device.

It is noted that the time constraint for updating the image descriptors in the first memory unit 20 may be relaxed compared to an implementation in which the image descriptors are copied from the first memory unit 20, e.g., the shadow register, to the second memory unit 22, e.g., the active register, with the beginning of each new frame, e.g., with each new vsync. Indeed, as explained above, the copy unit 24 may be arranged to copy the image descriptors from the first memory unit 20 to the second memory unit 22 only in response to the proceed signal 32 indicating that the update of the image descriptors in the first memory unit 20 is complete. The time constraint being relaxed, the first memory unit 20 does not necessarily have to be particularly fast. For instance, the first memory unit 20 may be a static random access memory (SRAM) unit. An SRAM unit can be more cost efficient compared to, e.g., a register or a set of registers in a processor. In contrast, the time available for reading out the second memory unit 22 may still be very short compared to, e.g., the duration of a frame as the video unit 16 may have to evaluate the image descriptors 28 received from the second memory unit 22 in a time that is short compared to the frame period. The second memory unit 22 may therefore be implemented as, e.g., a register of the video unit 16.

The copy unit 24 may further be arranged to generate a signal 34 when it has completed copying the set of image descriptors from the first memory unit 20 to the second memory unit 22. The update unit 18 may further be arranged to update the image descriptors in the first memory unit 20 only in response to the signal 34 indicating that the copy is complete. Inconsistent values of the image descriptors copied to the second memory unit 22 may thus be avoided.

Figure 6:
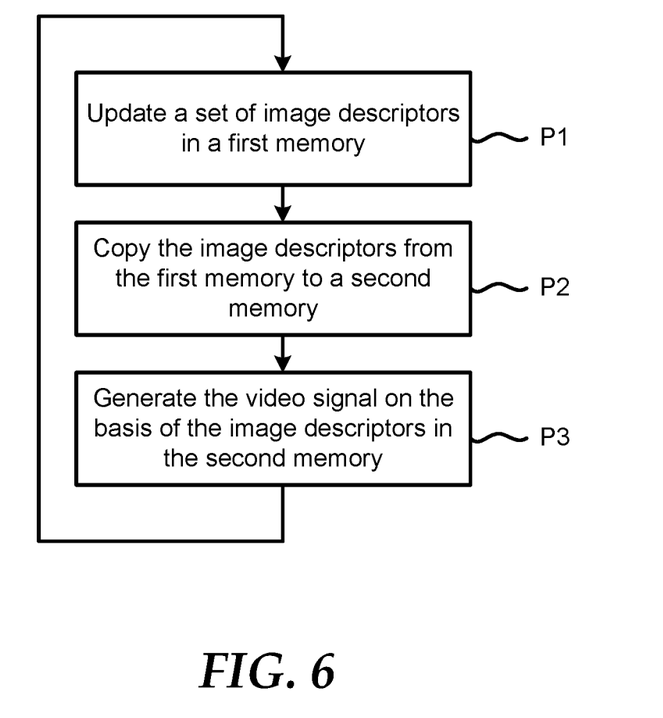
FIG. 6 schematically shows a flowchart of an example of an embodiment of a method of generating a video signal.

The method and device described above in reference to FIGS. 3, 4 and 5 is further illustrated by the flow chart in FIG. 6. The method may comprise: updating (P1) a set of image descriptors in a first memory unit 20, copying (P2) the image descriptors from the first memory unit 20 to a second memory unit 22 in response to an indication that the set of image descriptors buffered in the first memory unit 20 is up to date, and generating (P3) the video signal 30 on the basis of the image descriptors in the second memory unit 22.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, units 10, 12, and 14 may be located within a single device, e.g. in a navigation device. Alternatively, the examples may be implemented as any number of separate integrated circuits or separate devices interconnected with each other in a suitable manner. For example, units 10, 12, and 14 may be located at different positions in a vehicle and be interconnected in a suitable manner.

Also for example, the examples, or portions thereof, may be manufactured by implementing them as soft or code representations of physical circuitry or of logical representations convertible into physical circuitry, such as in a hardware description language of any appropriate type, and subsequently manufacturing physical circuitry according to the representation. For instance, a text model of the display control unit may first be written, e.g. in VHDL or another hardware description language, and then the model be converted into a mask set suitable to manufacture the display control unit, e.g. by converting the text model into a netlist which in-turn then converted into the layout for the individual masks in the mask set. The mask set may then be used to manufacture the display control unit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display controller configured to be connected to a display and arranged to generate a video signal representing a sequence of video frames to be displayed consecutively on said display, said display controller comprising:
a first memory arranged to buffer a set of image descriptors;
a second memory configured to be connected between said first memory and said display;
an updater connected to said first memory, the updater to update said image descriptors in said first memory, and to generate a proceed signal only after the update of said set of image descriptors in said first memory is completed, and to transmit the proceed signal after the proceed signal is generated, wherein the proceed signal indicates that the image descriptors in the first memory are consistent and that the updated set of image descriptors is to be copied from the first memory unit to the second memory unit;
a copier arranged to receive the transmitted proceed signal, and to copy said image descriptors from said first memory to said second memory unit in response to said proceed signal being received; and
a video generator arranged to generate said video signal on the basis of said image descriptors in said second memory.

2. The display controller of claim 1, wherein said first memory is a register.

3. The display controller of claim 1, wherein said second memory is a static random access memory.

4. The display controller of claim 1, wherein said updater is arranged to update said image descriptors only when said copier has terminated copying said image descriptors to second register.

5. The display controller of claim 1, wherein said updater is arranged to update said image descriptors in response to said copier having terminated copying said image descriptors to second register.

6. The display controller of claim 1, wherein said video generator is arranged to receive an image stream and to generate said video signal on the basis of said image descriptors in said second memory and said image stream.

7. The display controller of claim 1, wherein said image descriptors are arranged to describe several images to be displayed simultaneously on said display.

8. The display controller of claim 1, wherein said updater and said copier each comprise a dedicated integrated circuit.

9. A method for generating a video signal representing a sequence of video frames to be displayed consecutively on a display, comprising:
updating a set of image descriptors in a first memory unit;
transmitting a proceed signal only in response to the updating of the set of image descriptors in the first memory being completed, wherein the proceed signal indicates that the image descriptors in the first memory are consistent and that the updated set of image descriptors is to be copied from the first memory unit to a second memory unit;
receiving, at a copier, the transmitted proceed signal;
copying said image descriptors from said first memory unit to the second memory unit in response to the proceed signal being received; and
generating said video signal on the basis of said image descriptors in said second memory unit.

10. The method of claim 9, wherein said updating said image descriptors in said first memory starts in a first frame period and extends into a next frame period.

11. The method of claim 9, further comprising: receiving an image stream and generating said video signal on the basis of said image descriptors in said second memory unit and said image stream.

12. The method of claim 9, wherein said image descriptors are arranged to describe several images to be displayed simultaneously on said display.

13. The method of claim 9, wherein the second memory is a static random access memory.

14. The method of claim 9, wherein the first memory is a register.

15. A method for generating a video signal representing a sequence of video frames to be displayed consecutively on a display, comprising:
updating a set of image descriptors in a first memory;
transmitting a proceed signal only in response to the updating of the set of image descriptors in the first memory being completed, wherein the proceed signal indicates that the image descriptors in the first memory are consistent and that the updated set of image descriptors is to be copied from the first memory unit to a second memory unit;

receiving, at a copier, the transmitted proceed signal;

copying the image descriptors from the first memory to the second memory in response to the proceed signal being received and in response to a beginning of a new frame after the proceed signal is provided; and generating the video signal on the basis of the image descriptors in the second memory unit.

16. The method of claim 15, wherein the first memory is a register.

17. The method of claim 15, wherein the second memory is a static random access memory.

18. The method of claim 15, further comprising:

updating the image descriptors in response to a copying of the image descriptors to a second register being terminated.

19. The method of claim 15, further comprising:

receiving an image stream; and generating the video signal on the basis of the image descriptors in the second memory and the image stream.

20. The method of claim 15, wherein the image descriptors are arranged to describe several images to be displayed simultaneously on the display.

* * * * *